United States Patent
Edahiro et al.

(10) Patent No.: US 8,620,932 B2
(45) Date of Patent: Dec. 31, 2013

(54) PARALLEL SORTING APPARATUS, METHOD, AND PROGRAM

(75) Inventors: Masato Edahiro, Tokyo (JP); Yoshiko Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 906 days.

(21) Appl. No.: 12/518,687

(22) PCT Filed: Dec. 4, 2007

(86) PCT No.: PCT/JP2007/073421
§ 371 (c)(1),
(2), (4) Date: Jun. 11, 2009

(87) PCT Pub. No.: WO2008/078517
PCT Pub. Date: Jul. 3, 2008

(65) Prior Publication Data
US 2010/0031008 A1    Feb. 4, 2010

(30) Foreign Application Priority Data

Dec. 22, 2006    (JP) .................................. 2006-345802

(51) Int. Cl.
*G06F 17/30* (2006.01)
*G06F 7/00* (2006.01)
(52) U.S. Cl.
USPC .......................................... 707/752; 707/764
(58) Field of Classification Search
USPC ................................................. 707/752, 764
See application file for complete search history.

(56) References Cited

U.S. PATENT DOCUMENTS

| | | | | |
|---|---|---|---|---|
| 5,797,000 A | * | 8/1998 | Bhattacharya et al. | 707/764 |
| 6,438,558 B1 | * | 8/2002 | Stegelmann | 707/615 |
| 7,779,008 B2 | * | 8/2010 | Dageville et al. | 707/737 |
| 2005/0144167 A1 | * | 6/2005 | Yamamoto | 707/7 |
| 2007/0250470 A1 | * | 10/2007 | Duffy et al. | 707/2 |

FOREIGN PATENT DOCUMENTS

| | | |
|---|---|---|
| JP | 3415914 B | 4/2003 |
| JP | 2005018158 A | 1/2005 |
| JP | 2006048192 A | 2/2006 |

OTHER PUBLICATIONS

International Search Report for PCT/JP2007/073421 mailed Mar. 4, 2008.
M. Edahiro et al., "Map Sort: A Scalable Sorting Algorithm for Multi-Core Processors", IEICE Technical Report, DC, Dependable Computing, vol. 106, No. 603, The Institute of Electronics, Information and Communication Engineers, Mar. 8, 2007, pp. 19 to 24.

* cited by examiner

Primary Examiner — Pavan Mamillapalli

(57) ABSTRACT

A parallel sorting apparatus is provided whose sorting processing is speeded up. A reference value calculation section calculates a plurality of reference values serving as boundaries of intervals used for allocating input data depending on the magnitude of a value. An input data aggregation section partitions the input data into a plurality of input data regions, and calculates, by parallel processing, mapping information used for allocating data in each of the partitioned input data regions to the plurality of intervals that have boundaries on the reference values calculated by the reference value calculation section. A data allocation section allocates, by parallel processing, data in each of the input data regions to the plurality of intervals in accordance with the mapping information calculated by the input data aggregation section. An interval sorting section individually sorts, by parallel processing, data in the plurality of intervals allocated by the data allocation section.

18 Claims, 11 Drawing Sheets

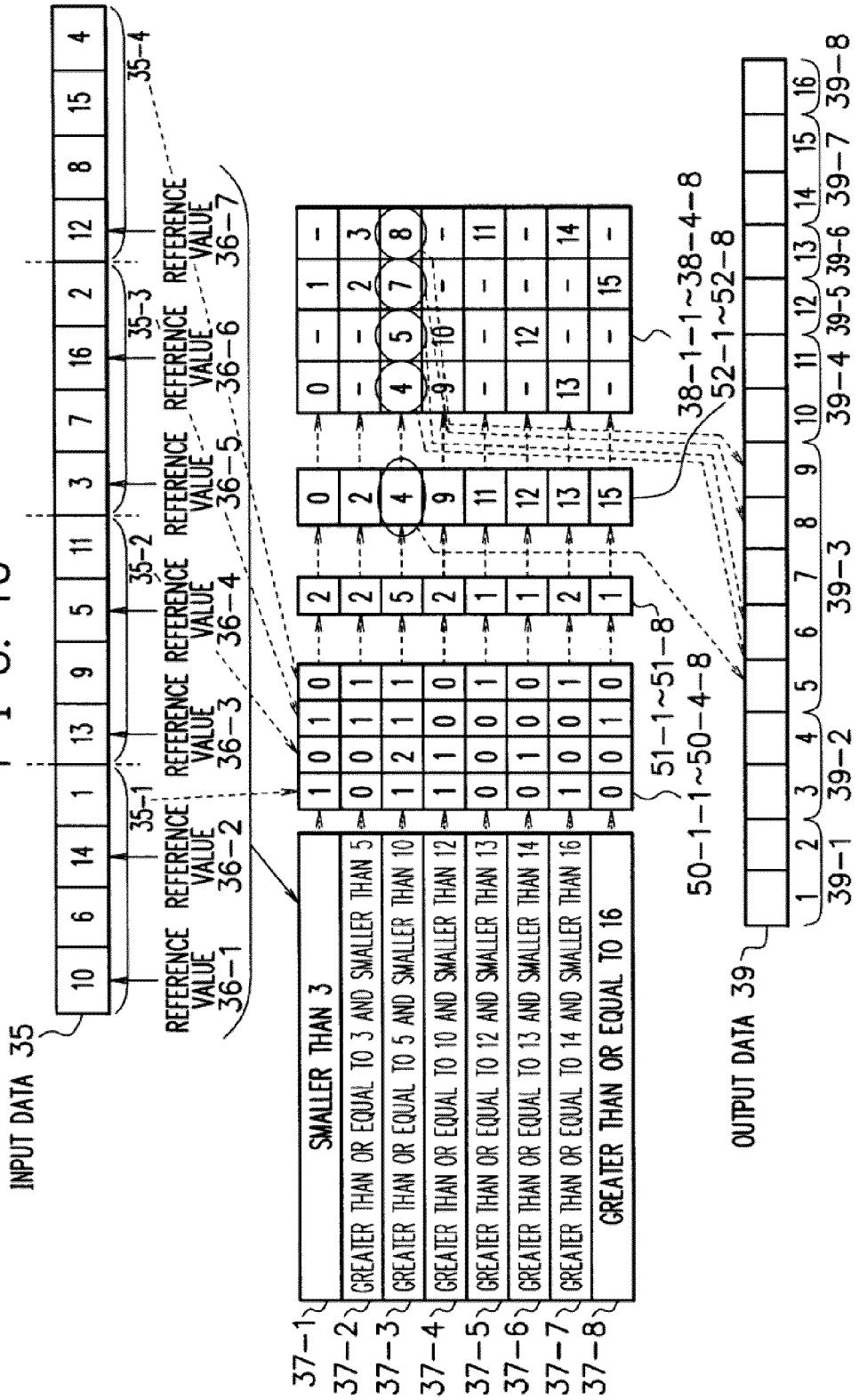

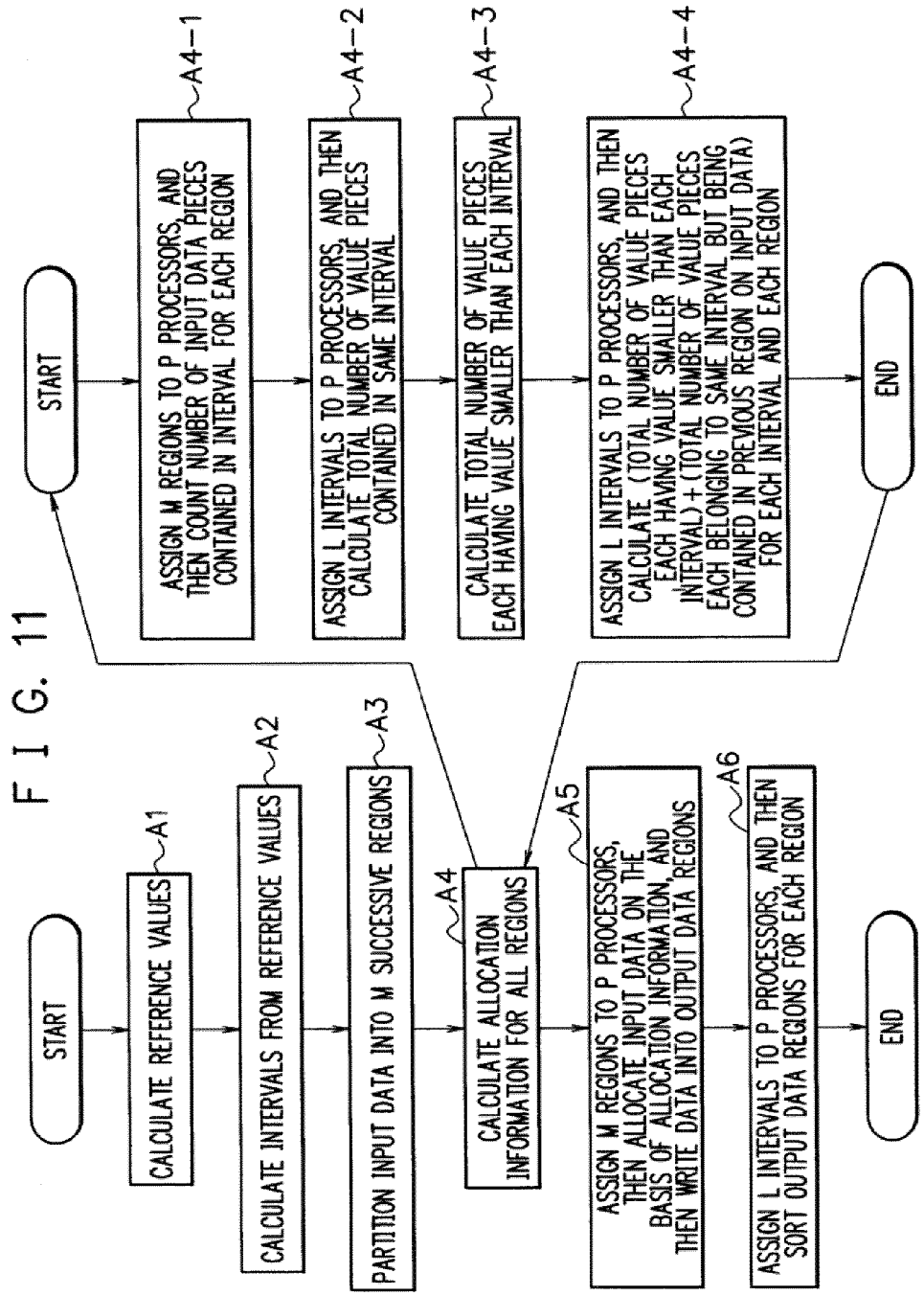

PARALLEL SORTING APPARATUS, METHOD, AND PROGRAM

This application is the National Phase of PCT/JP2007/073421, filed Dec. 4, 2007, which is based upon and claims the benefit of priority from Japanese patent application No. 2006-345802, filed on Dec. 22, 2006, the disclosure of which is incorporated herein in its entirety by reference.

TECHNICAL FIELD

The present invention relates to a parallel soiling apparatus, method, and program for performing parallel processing of sorting data.

BACKGROUND ART

Examples of methods of performing parallel processing of sorting data are disclosed in Patent Documents 1 and 2.

FIG. 1 is a diagram for describing a parallel sorting method disclosed in Patent Document 1. FIG. 2 is a block diagram showing a configuration of a parallel sorting apparatus disclosed in Patent Document 1. A parallel sorting technique disclosed in Patent Document 1 is described below with, reference to these figures.

As shown in FIG. 2, input data 81 to be sorted is inputted to a parallel sorting apparatus. Input processing for input data 81 is performed by data input processing means 92, and then the data is stored into a main storage area 95. When thread start processing means 93 starts up a thread (not shown) in a thread pool 94, the thread recursively repeats processing of reading and processing data from the main storage area 95 and then writing back the data. When sorting is completed by the recursive processing by the thread pool 94, data output processing means 97 reads the data from the main storage area 95 and then outputs the data as output data 85.

Referring to FIG. 1, input data 81 composed of 16 values is illustrated. A thread selects a key 82 for the input data 81. Here, the key 82="10". Then, the thread classifies the input data 81 into a data set 83 of values smaller than the key 82 and a data set 84 of values greater than or equal to the key 82, and then stores the data into the main storage area 95. As a result, the input data 81 arranged as shown in (a) is rearranged as shown in (b). When the processing of selecting a key and classifying data is recursively repeated for each data set, sorting is completed finally as shown in (d).

FIG. 3 is a diagram for describing a parallel sorting method disclosed in Patent Document 2. In the parallel sorting technique disclosed in Patent Document 2, to-be-sorted input data 101 given as shown in (a) is divided into a plurality of parts as shown in (b) in correspondence to a plurality of processors. Here, four processors referred to as processors 0 to 3 are assumed.

Each of the processors 0 to 3 sorts data in an assigned part. As a result, the data 102 shown in (b) is rearranged into the data 103 shown in (c). Then, the plurality of processors 0 to 3 merge data sets within each part where sorting has been completed. Here, the part corresponding to the processor 0 is merged with the part corresponding to the processor 1, while the part corresponding to the processor 2 is merged with the part corresponding to the processor 3. As a result, the data 103 shown in (c) is rearranged into the data 104 shown in (d). When this processing of sorting and merging is repeated recursively, sorting is completed finally as shown in (e).

Patent Document 1: Japanese Patent Laid-Open Publication No. 2005-18158 (pages 7 to 12, FIG. 1)
Patent Document 2: Japanese Patent No. 3415914 (pages 4 to 5, FIG. 1)

DISCLOSURE OF THE INVENTION

Problems to be Solved by the Invention

Nevertheless, in the parallel sorting method disclosed in Patent Document 1, a processor is assigned for each data set onto which classification processing is to be performed. Thus, the effect of parallel processing is not obtained when the number of data sets is not a large number. In accordance with progressing of classification by the repeat of recursive processing, the number of data sets increases and hence the effect of parallel processing appears gradually. Nevertheless, in the beginning, the number of data sets is smaller than the number of processors and hence excessive processors are in a waiting state. For example, in FIG. 1, the processing of classifying the input data 81 into data 83 and data 84 is executed only by one processor. Thus, the other processors all await.

Further, in the parallel sorting method disclosed in Patent Document 2, for the purpose of speed-up, processing is performed with storing merged data into another region in the main storage area. Nevertheless, a large number of times of merge processing is performed. Paragraph 0070 in Patent Document 2 describes that a tournament method is used as an example of the merge processing. Nevertheless, in the tournament method, merging is repeated many times. Thus, the number of times of merge processing increases. Accordingly, in a computer system in whose memory system has a slow operation speed, the merge processing that requires accessing to the memory prevents speed-up of the sorting.

An exemplary object of the present invention is to provide a parallel sorting apparatus with high-speed sorting processing.

Means for Solving the Problem

In order to achieve the above-mentioned exemplary objects, the parallel sorting apparatus in accordance with an exemplary aspect of the present invention is a parallel sorting apparatus for sorting, by parallel processing, input data composed of a plurality of data pieces, including:

a reference value calculation section that calculates a plurality of reference values serving as boundaries of intervals used for allocating the input data depending on a magnitude of a value thereof on the basis of the input data;

an input data aggregation section that partitions the input data into a plurality of input, data regions, and calculates, by parallel processing, mapping information used for allocating data in each of the partitioned input data regions to the plurality of intervals that have boundaries on the reference values calculated by the reference value calculation section;

a data allocation section that allocates, by parallel processing, data in each of the input data regions to the plurality of intervals in accordance with the mapping information calculated by the input data aggregation section; and an interval sorting section that individually sorts, by parallel processing, data in the plurality of intervals allocated by the data allocation section.

According to the present invention, data in a plurality of input data regions where input data has been partitioned are allocated to a plurality of intervals by parallel processing. Then, the data in a plurality of intervals is sorted individually by parallel processing. Thus, the processing that requires a long time is performed by parallel processing, and hence the overall sorting processing can be speeded up.

Further, the mapping information may be information that is used, when the data contained in the plurality of input data regions are to be allocated to the plurality of intervals, for determining output data regions corresponding to the intervals where the data allocated to the plurality of intervals are to be accumulated, and the input data aggregation section may count the number of data pieces contained in each of the intervals for each of the input data regions, and aggregate the counted results for each input data region so as to calculate the mapping information such that each of the plurality of output data regions have a size that allows the data allocated to the intervals to be accumulated without mutual overlapping of the data.

According to this, the processing of allocating the data in the individual input data regions can be executed independently of each other. Thus, processing for a plurality of input data regions can be executed in parallel.

Further, the number of the input data regions may be equal to the number of a plurality of processors for executing the parallel processing or to an integral multiple of the number of the processors.

According to this, processing corresponding to each input data region can be assigned to each processor without uselessness. Thus, the processors can be used efficiently.

Further, the input data aggregation section may partition the input data into the input data regions having been equalized.

According to this, the loads of parallel processing can be equalized, and hence the efficiency of parallel processing is improved.

Further, on the basis of the number of data pieces allocated to each of the plurality of intervals, the interval sorting section may assign the intervals to the processors such that the loads of the plurality of processors for executing the parallel processing are equalized.

According to this, the utilization efficiency of the processors is improved so that the effect of speed-up by parallel processing is enhanced.

Further, the number of the intervals partitioned on the basis of the reference values may be equal to the number of processors for executing the parallel processing or to an integral multiple of the number of the processors.

According to this, a difference in the processing time caused by a variation between the processors for performing parallel processing on the individual intervals can easily be reduced. Thus, the utilization efficiency of the processors can be improved.

Further, the reference value calculation section may calculate the reference values on the basis of statistical processing onto the input data, such that the numbers of data pieces to be allocated to the plurality of intervals are equalized.

According to this, the utilization efficiency of the processors in the parallel processing is improved.

Effect of the Invention

According to the present invention, processing that requires a long time is performed by parallel processing. Thus, sorting processing can be speeded up.

BEST MODE FOR CARRYING OUT THE INVENTION

Exemplary embodiments for implementing the present invention will be described in detail with reference to the drawings.

First Exemplary Embodiment

FIG. 4 is a block diagram showing the configuration of a parallel sorting apparatus according to a first exemplary embodiment. FIG. 5 is a schematic diagram for describing the operation of the parallel sorting apparatus and its individual sections according to the first exemplary embodiment. As shown in FIG. 4, the parallel sorting apparatus includes a reference value calculation section 1, an input data aggregation section 2, a data allocation section 3, and an interval sorting section 4. Then, these sections sequentially perform processing to sort data. As shown in FIG. 5, input to the parallel sorting apparatus is input data 5. The parallel sorting apparatus sorts the input data 5, and then outputs the sorted result as output data 9.

The reference value calculation section 1 selects L-1 reference values 6-1 to 6-(L-1) from the input data 5. These reference values 6-1 to 6-(L-1) serve as boundaries used for allocating the individual data pieces of the input data 5 depending on the magnitudes of the values. Then, the reference value calculation section 1 arranges the L-1 reference values 6-1 to 6-(L-1) in accordance with the order relation (the magnitudes of the values) so as to construct L intervals 7-1 to 7-L.

The input data aggregation section 2 partitions the input data 5 into M input date regions 5-1 to 5-M. At the time, for the purpose of improvement of the efficiency of parallel processing, it is preferable that the sizes of the input data regions 5-1 to 5-M are equalized. Then, the input data aggregation section 2 calculates mapping information 8-1-1 to 8-M-L used for allocating the data in each partitioned input data region 5-1 to 5-M to intervals 7-1 to 7-L constructed by the reference value calculation section 1.

In the calculation of this mapping information 8-1-1 to 8-M-L, the input data aggregation section 2 performs, by parallel processing, the processing corresponding to the individual intervals 7-1 to 7-L. This parallel processing may be performed by assigning a plurality of processors to the individual intervals 7-1 to 7-L and then executing the allocation processing in parallel. Alternatively, a plurality of threads may be defined, and then parallel processing may be executed virtually.

Further, by calculating the mapping information 8-1-1 to 8-M-L in advance, allocation can be executed independently for the individual input data regions 5-1 to 5-M. Thus, parallel processing of allocation for the individual regions 5-1 to 5-M can be performed.

In accordance with the mapping information 8-1-1 to 8-M-L calculated by the input data aggregation section 2, the data allocation section 3 allocates the data in the input data regions 5-1 to 5-M to output data regions 9-1 to 9-L corresponding to the intervals 7-1 to 7-L. At that time, the data allocation section 3 performs parallel processing on the individual input data regions 5-1 to 5-M. In the parallel processing, a plurality of processors may be assigned to the individual input data regions 5-1 to 5-M, and then allocation processing may be executed in parallel. Alternatively, a plurality of threads may be defined, and then parallel processing may be executed virtually.

The interval sorting section 4 sorts individually the data in the output data regions 9-1 to 9-L allocated by the data allocation section 3. At that time, the interval sorting section 4 performs parallel processing on the individual output data regions 9-1 to the 9-L. In the parallel processing, a plurality of processors may be assigned to the individual output data regions 9-1 to 9-L, and then allocation processing may be executed in parallel. Alternatively, a plurality of threads may be defined, and then parallel processing may be executed virtually. When the sorting by the interval sorting section 4 is completed, sorted output data 9 is obtained.

FIG. 6 is a flow chart showing the operation of the parallel sorting apparatus according to the first exemplary embodiment. Referring to FIG. 6, first, using the data set in the input data 5, the reference value calculation section 1 calculates L-1 reference values 6-1 to 6-(L-1) (step A1). Then, the reference value calculation section 1 arranges the reference values 6-1 to 6-(L-1) in accordance with the order relation so as to calculate intervals 7-1 to 7-L having boundaries on the reference values 6-1 to 6-(L-1) (step A2).

Further, the input data aggregation section 2 partitions the input data 5 into M successive input data regions 5-1 to 5-M (step A3).

Further, for each of the input data regions 5-1 to 5-M, the input data aggregation section 2 checks the values of the entire data in the region, and then calculates mapping information 8-1-1 to 8-M-L used for allocating the data to regions corresponding to the intervals 7-1 to 7-L (step A4).

Then, for each of the input data regions 5-1 to 5-M, the data allocation section 3 checks the values of the entire data in the region, and then writes the individual data pieces into the output data regions 9-1 to 9-L on the basis of the mapping information 8-1-1 to 8-M-L (step A5). As a result, each of the output data regions 9-1 to 9-L is constructed only from data of values within the corresponding one of the intervals 7-1 to 7-L.

Finally the interval sorting section 4 sorts the data within each of the output, data regions 9-1 to 9-L (step A6). As a result, output data 9 whose entirety has been sorted is obtained.

As described above, according to the exemplary embodiment, the data in M input, data regions 5-1 to 5-M constructed by partitioning the input data 5 is allocated to regions corresponding to L intervals 7-1 to 7-L by parallel processing. Then, the data in L intervals 7-1 to 7-L is sorted by parallel processing. Thus, the processing that requires a long time is performed by parallel processing, and hence the overall sorting processing can be speeded up.

Here, in the exemplary embodiment, the processing of calculating reference values at step A1, the processing of calculating intervals at step A2, and the processing of partitioning the input data 5 at step A3 are performed not by parallel processing. However, when L and M are set to be appropriate values, the ratio of the processing time of steps A1 to A3 to the processing time of the overall sorting processing can be suppressed small. For example, when L and M are sufficiently smaller than the number of data pieces of the input data 5, the processing time of steps A1 to A3 is negligible small.

Further, in the exemplary embodiment, the processing of copying the entire input data 5 is performed only once at step A5. Thus, the influence of the operation speed of the memory system can be suppressed small.

Second Exemplary Embodiment

In the first exemplary embodiment, definite limitation has not been placed whether the parallel processing is performed by a plurality of processors or achieved virtually. In contrast, a second exemplary embodiment illustrates parallel processing performed by a multiprocessor.

In the second exemplary embodiment, a parallel sorting apparatus is constructed from a multiprocessor system employing a plurality of processors. The multiprocessor system executes a program for performing parallel processing of sorting data. In the second exemplary embodiment, the parallel sorting apparatus according to the first exemplary embodiment is constructed from a multiprocessor system. Thus, the basic function has no difference, and hence parts different from those of the first exemplary embodiment are described mainly.

The parallel sorting apparatus according to the second exemplary embodiment has a configuration similar to that of the parallel sorting apparatus according to the first exemplary embodiment shown in FIG. 4. FIG. 7 is a schematic diagram for describing the operation of the parallel sorting apparatus and its individual sections according to the second exemplary embodiment. Here, a multiprocessor system 71 is assumed to have processors in a number greater than or equal to P.

As shown in FIG. 7, in the parallel sorting apparatus according to the second exemplary embodiment, the multiprocessor system 71 reads and executes a parallel sorting program 72. As a result, the multiprocessor system 71 operates as the reference value calculation section 1, the input data aggregation section 2, the data allocation section 3, and the interval sorting section 4 of the parallel sorting apparatus described in the first exemplary embodiment.

At that time, in the multiprocessor system 71, the parallel processing in the operation at steps A4 to A6 shown in FIG. 6 is performed by parallel operation of P processors.

According to the exemplary embodiment, the processing at steps A4 to A6 that requires a long time is performed by parallel processing by the plurality of processors. Thus, the overall sorting processing can be speeded up.

First Example

A detailed example of the parallel sorting apparatus according to the first, or the second exemplary embodiment described above is given as a first example.

FIG. 8 is a schematic diagram for describing the operation of a parallel sorting apparatus in the first example. As shown in FIG. 8, it is assumed that 16 numerical values are given as input data 35 to the parallel sorting apparatus. Further, M=4 and L=8 are assumed in the present example.

Referring to the flow chart of FIG. 8, first, at step A1, the reference value calculation section 1 calculates L-1=7 reference values 36-1 to 36-7. Then, at step A2, the reference value calculation section 1 generates eight intervals 37-1 to 37-8 by using the reference values 36-1 to 36-7. Further, at step A3, the input data aggregation section 2 divides the input data 35 into M=4 input data regions 35-1 to 35-4.

Then, at step A4, for each of the input data regions 35-1 to 35-4, the input data aggregation section 2 calculates mapping information 38-1-1 to 38-4-8 used for allocating the data to regions corresponding to the intervals 37-1 to 37-8.

In the present example, detailed operation within the step A4 is described also. FIG. 9 is a flow chart showing the detailed operation within the step A4. FIG. 10 is a schematic diagram for describing the detailed operation within the step A4.

Referring to FIG. 9, first, for each input data region and each interval, the input data aggregation, section 2 counts the number of data pieces that are contained in each of the input, data regions 35-1 to 35-4 and contained in each of the intervals 37-1 to 37-8. Then, the input data aggregation section 2 stores the results as number-of-data-pieces values 50-1-1 to 50-4-8 in a matrix form (step A4-1).

Then, for all j each having a value from 1 to 8, the input data aggregation section 2 calculates the total of the number-of-data-pieces values 50-1-j to 50-4-j, and then stores the result as a total-number-of-intervals value 51-j (step A4-2). The total-number-of-intervals value 51-j indicates the number of numerical value (data) pieces contained in the interval 37-j among the 16 numerical values in the input data 35.

Further, for all j each having a value from 1 to 8, the input data aggregation section 2 calculates the total from the total-number-of-intervals value 51-1 to the total-number-of-intervals value 51-(j-1), and then stores the result as an accumulated-number-of-pieces value 52-j (step A4-3). The accumulated-number-of-pieces value 52-j indicates the total number of numerical value pieces each having a value smaller than the minimum numerical value contained in the interval 37-j among the 16 numerical values in the input data 35. At step A5 shown in FIG. 6, the data allocation section 3 allocates by parallel processing the input data 35-1 to 35-4 to output data regions 39-1 to 39-8 corresponding to the intervals 37-1 to 37-8. At the time, the start position of the output data region 39-j is located at an {(accumulated-number-of-pieces value 52-j)+"1"}-th position. For example, the interval 37-3 is for values "greater than or equal to 5 and smaller than 10". Thus, the output data region 39-3 into which values "greater than or equal to 5 and smaller than 10" are to be allocated starts at the fifth ((accumulated-number-of-pieces 52-3)+"1"="5") position in the output data 39, and ends at the ninth ((accumulated-number-of-pieces 52-4)="9") position. When the output data regions 39-1 to 39-8 are determined by this procedure and then the data is allocated, the data can be allocated such that the data pieces in the individual intervals do not overlap with each other. As a result, the processing of allocating the data in the individual input data regions can be executed independently of each other. Thus, processing for a plurality of input data regions can be executed in parallel.

Returning to FIG. 9, then, for all j each having a value from 1 to 8 and all i each having a value from 1 to 4, the input data aggregation section 2 adds to the accumulated-number-of-pieces value 52-j the total from the number-of-data-pieces value 50-1-j to the number-of-data-pieces value 50-(i−1)-j, and then stores the result as mapping information 38-i-j (step A4-4).

Here, at that time, when the number-of-data-pieces value 50-i-j is "0", this indicates that data contained in the input data region 35-i is not contained in the interval 37-j. Thus, nothing need be stored as the mapping information 38-i-j.

The meaning of the mapping information 38-i-j is as follows. At step A5, among the data pieces contained in each of the input data regions 35-1 to 35-4, data pieces contained in the interval 37-j need be allocated to the output data region 39-j without overlapping. At that time, when the data pieces contained in the input data region 35-i is copied to the region starting at the {(mapping information 38-i-j)+"1"}-th position, the data can be allocated to the output data regions 39-1 to 39-8 without overlapping even in a case that the processing of copying the data in the individual input data regions 35-1 to 35-4 is performed by parallel processing.

For example, referring to FIG. 10, the mapping information 38-1-3 is "4", the mapping information 38-2-3 is "5", the mapping information 38-3-3 is "7", and the mapping information 38-4-3 is "8". Thus, it is sufficient that data "greater than or equal to 5 and smaller than 10" contained in the input data region 35-1 is allocated to the region starting at the fifth region of the region of the output data 39. Further, it is sufficient; that data "greater than or equal to 5 and smaller than 10" contained in the input, data region 35-2 is allocated to the region starting at the sixth region of the region of the output data 39. Further, it is sufficient that data "greater than or equal to 5 and smaller than 10" contained in the input data region 35-3 is allocated to the region starting at the eighth region of the region of the output data 39. Further, it is sufficient that data "greater than or equal to 5 and smaller than 10" contained in the input data region 35-4 is allocated to the region starting at the ninth region of the region of the output data 39.

Returning to FIG. 6, after the processing at step A4, at step A5, for each data piece in each input data region 35-i, the data allocation section 3 calculates an interval 37-j in which the data piece is to be contained, and then stores sequentially the data pieces into a region starting at the {(mapping information 38-i-j)+"1"}-th position in the region of the output data 39.

Finally, at step A6, the interval sorting section 4 sorts the data in each of the output data regions 39-1 to 39-8. As a result, sorting of the entire output data 39 is completed so that a sorting result is obtained. In the sorting processing for each of the output data regions 39-1 to 39-8 performed by the interval sorting section 4 may be performed by employing sorting processing such as a quick sort for a general single processor.

Second Example

A detailed example of the parallel sorting apparatus according to the second exemplary embodiment is given as a second example. In the second example, as shown in FIG. 7, a multiprocessor system 71 executes a parallel sorting program 72. The multiprocessor system 71 is assumed to have processors in a number greater than or equal to P.

FIG. 11 is a flow chart showing processing performed by a parallel sorting program. In FIG. 11, it is characterized in the point that the processing at step A4 in the flow chart of FIG. 6 is implemented as the processing shown in the detailed flow chart of FIG. 9. It is also characterized in the point that the processing at steps A4 to A6 is parallel processing performed by P processors.

Referring to FIG. 11, the aggregation processing of generating mapping information at step A4 is executed in parallel by P processors so that speed-up is achieved.

At step A4-1, the individual processing pieces corresponding to the individual input data regions 5-1 to 5-M are assigned to a plurality of processors. At steps A4-2 and A4-4, the individual processing pieces corresponding to the individual intervals 7-1 to 7-L are assigned to a plurality of processors.

For example, in the example shown in FIG. 10, in a case that the number of processors is 4, M=4, and L=8, at step A4-1, the counting processing for the individual input data regions 35-1 to 35-4 can be executed simultaneously by the four processors. Further, at step A4-2, the processing of aggregating the number-of-data-pieces values 50-1-1 to 50-4-8 can simultaneously be executed independently for the individual intervals 7-1 to 7-8 by the four processors. Further, at step A4-4, the processing of calculating the mapping information 38-1-1 to 38-4-8 can simultaneously be executed independently for the individual Intervals 7-1 to 7-8 by the four processors.

Further, returning to FIG. 11, the data allocation processing at step A5 are executed in parallel by the P processors so that speed-up is achieved.

For example, in the example shown in FIG. 8, in a case that the number of processors is 4, M=4, and L=8, the data of the individual input data regions 35-1 to 35-4 can be allocated simultaneously to the four processors.

Further, in FIG. 11, the sorting processing at step A6 is executed in parallel by the P processors so that speed-up is achieved.

For example, in the example shown in FIG. 8, in a case that the number of processors is 4, M=4, and L=8, the four processors can perform data sorting simultaneously for the individual output data regions 39-1 to 39-8.

Here, in FIG. 11, in the example, the processing at steps A1, A2, A3, and A4-3 is not treated as a target of parallel processing because when the values of L and M are selected appropriately its influence to the overall sorting processing time can be suppressed small. However, these processing pieces also may be performed by parallel processing by a plurality of processors.

For example, at steps A1 and A2, the processing for the individual reference values can be performed by parallel processing by a plurality of processors. Further, at step A3, the processing for the individual regions can be performed by parallel processing by a plurality of processors. Further, since the content of the processing at step A4-3 is arithmetic totaling operation, a known arithmetic totaling operation technique by parallel processors may be employed.

Further, in each exemplary embodiment and each example described above, the value of M may be selected arbitrarily. However, in order that the effect of speed-up by parallel processing should be enhanced, it is preferable that the value of M is set to be a value greater than or equal to the number of processors. For example, when M is set equal to the number of processors or its integral multiple, the processing corresponding to the individual input data regions 5-1 to 5-M can be assigned to the individual processors without uselessness. As a result, a situation is avoided that a part of processors are in a waiting state. Thus, the processors can be used efficiently.

Further, in each exemplary embodiment and each example described above, the value of L may be selected arbitrarily. However, in order that the effect of speed-up by parallel processing should be enhanced, it is preferable that the value of L is set to be a value greater than or equal to the number of processors. After the data allocation at step A5, variation can occur in the sizes of the individual output data regions 9-1 to 9-L. Then, in association with this, when variation occurs in the amounts of processing for the individual processors in the interval sorting processing for the output data regions 9-1 to 9-L at step A6, the effect of speed-up by parallel processing decreases. Accordingly, it is preferable that L is set to be a value greater than the number of processors and that when the output data regions 9-1 to 9-L are assigned to the processors at step A6, the interval sorting section 4 adjusts the loads of the processors such as to be equalized. As a result, the utilization efficiency of the processors is improved so that the effect of speed-up by parallel processing is enhanced.

For example, at the time that the output data regions 9-1 to 9-L are assigned to the P processors, it is sufficient that the sum of the sizes of the regions assigned to each processor is adjusted such as to foe equalized for all processors. The size of each of the output data regions 9-1 to 9-L is equal to the number of data pieces assigned to each of the corresponding intervals 7-1 to 7-L. Thus, when the sum of the sizes of regions assigned to each processor is equalized, the number of data pieces to be processed by each processor is equalized. Accordingly, the loads of the processors are equalized.

Further, if is preferable that L is set equal to the number of processors or its integral multiple. In a method, the integral value is from 1 to 5 or the like. In a case that the sizes of the output data regions 9-1 to 9-L are almost equal to each other, when L is set equal to the number of processors or its integral multiple, the difference in the processing time caused by the variation in the processors at step A6 can easily be reduced. Nevertheless, when an excessively large integral value is employed, the overhead of processing becomes large and hence speed-up is prevented in contrast to the intension.

Further, in each exemplary embodiment, and each example described above, it is preferable that the reference values at step A1 are selected such that the variation in the sizes of the output data regions 9-1 to 9-L is reduced. Thus, when reference values allocated as uniformly as possible are selected by using statistical processing or the like, the utilization efficiency of the processors in the parallel processing is improved. FIG. 8 shows an example that reference values are selected at regular intervals from the input data 35. However, the present invention is not restricted to this example. In another example, in FIG. 5, data pieces in a number greater than L-1 may be acquired from the input data 5. Then, their distribution may be checked. After that, on the basis of the acquired distribution, L-1 reference values may be selected such that the number of data pieces in each interval is equalized.

Further, in each exemplary embodiment and each example described above, an example has been given that reference values are selected from the input data 5. However, the present invention is not limited to this. In a case that reference values are statistically calculated, values not contained in the input data 5 may be selected as reference values.

For example, in a method, in FIG. 5, K*L data pieces (K is the constant) are extracted from the input data 5, and then grouped into K groups in accordance with the order relation (the magnitudes of the values). Then, each number between groups may be adopted as a reference value.

Another example is a method that statistical distribution prediction or number-of-data-pieces prediction is performed on a plurality of data pieces acquired from the input data regions 5-1 to 5-M and then L-1 reference values are selected such as to minimize the variation in the sizes of the output, data regions 9-1 to 9-L. The statistical distribution prediction or the number-of-data-pieces prediction can be performed by an existing technique in statistics. In particular, such a statistical method is effective when the input data has a known distribution such as a uniform distribution or a normal distribution. The maximum value and the minimum value are to be acquired in the case of a uniform distribution, while the average and the variance are to be acquired in the case of a normal distribution. Then, on the basis of these values, reference values can be calculated. When reference values are selected by such a statistical method, the processing time of step A1 increases in comparison with a case that reference values are simply selected. Thus, the processing at step A1 may be performed by a plurality of processors so that speed-up may be achieved.

BRIEF DESCRIPTION OF THE DRAWINGS

FIG. 10 is a schematic diagram for describing detailed operation within a step A4.

FIG. 11 is a flow chart showing processing performed by a parallel sorting program.

DESCRIPTION OF REFERENCE NUMERALS

Figure 1:
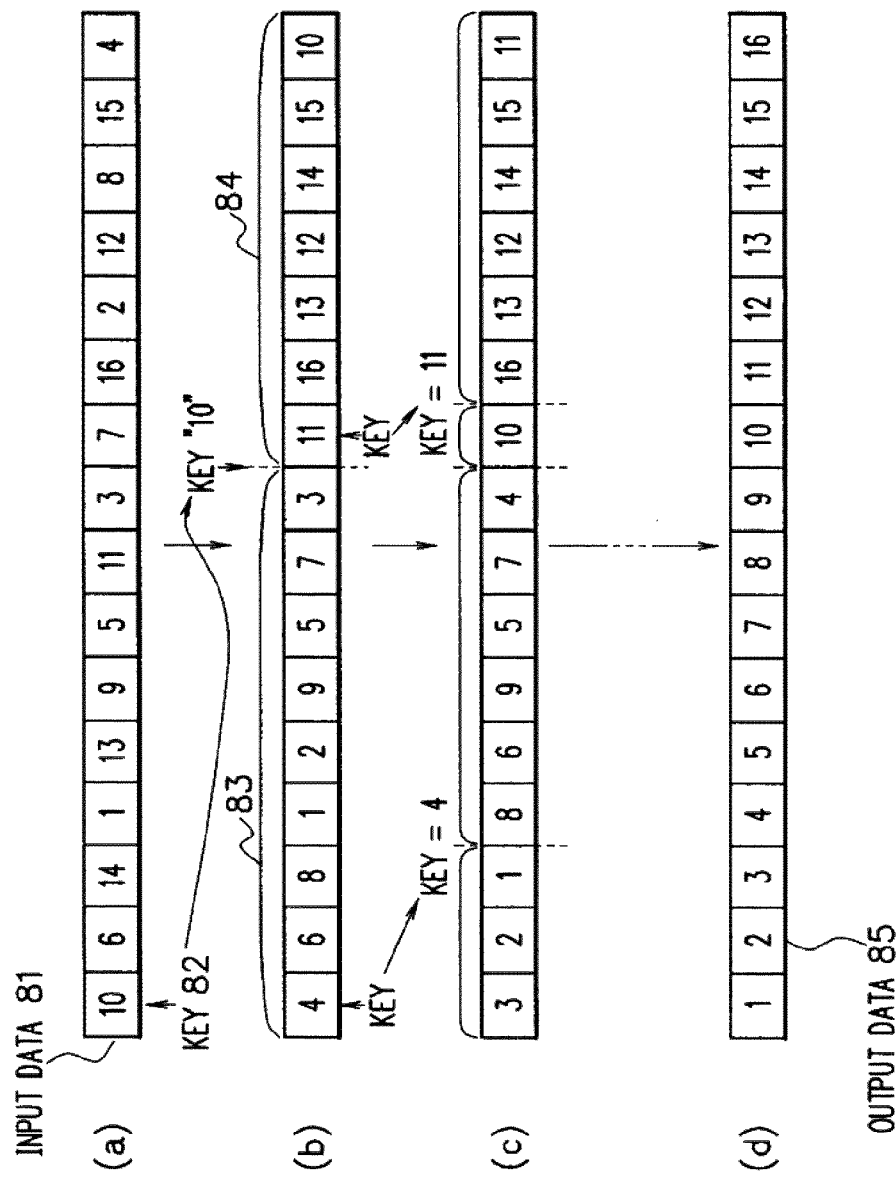
FIG. 1 is a diagram for describing a parallel sorting method disclosed in Patent Document 1.
Figure 2:
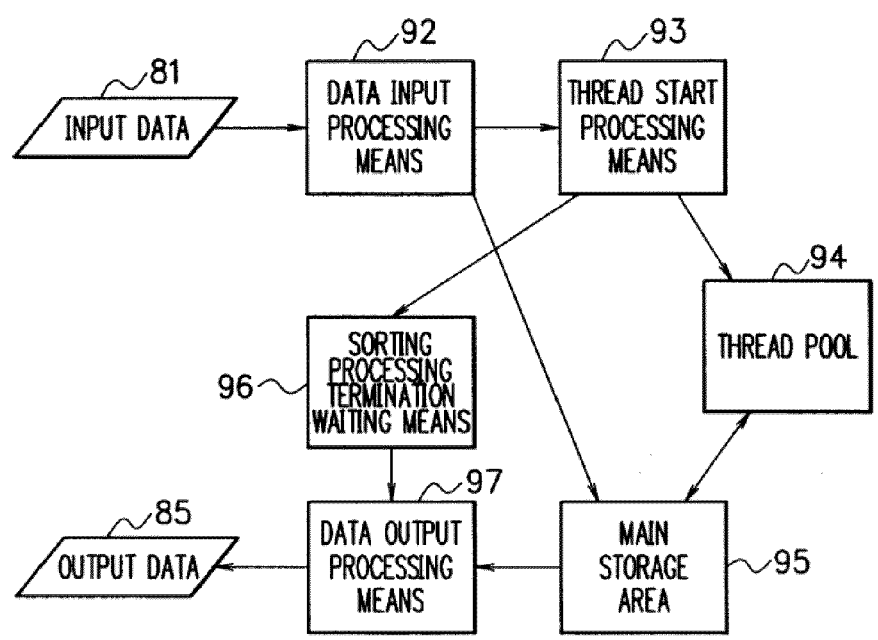
FIG. 2 is a block diagram showing a configuration of a parallel sorting apparatus disclosed in Patent Document 1.
Figure 3:
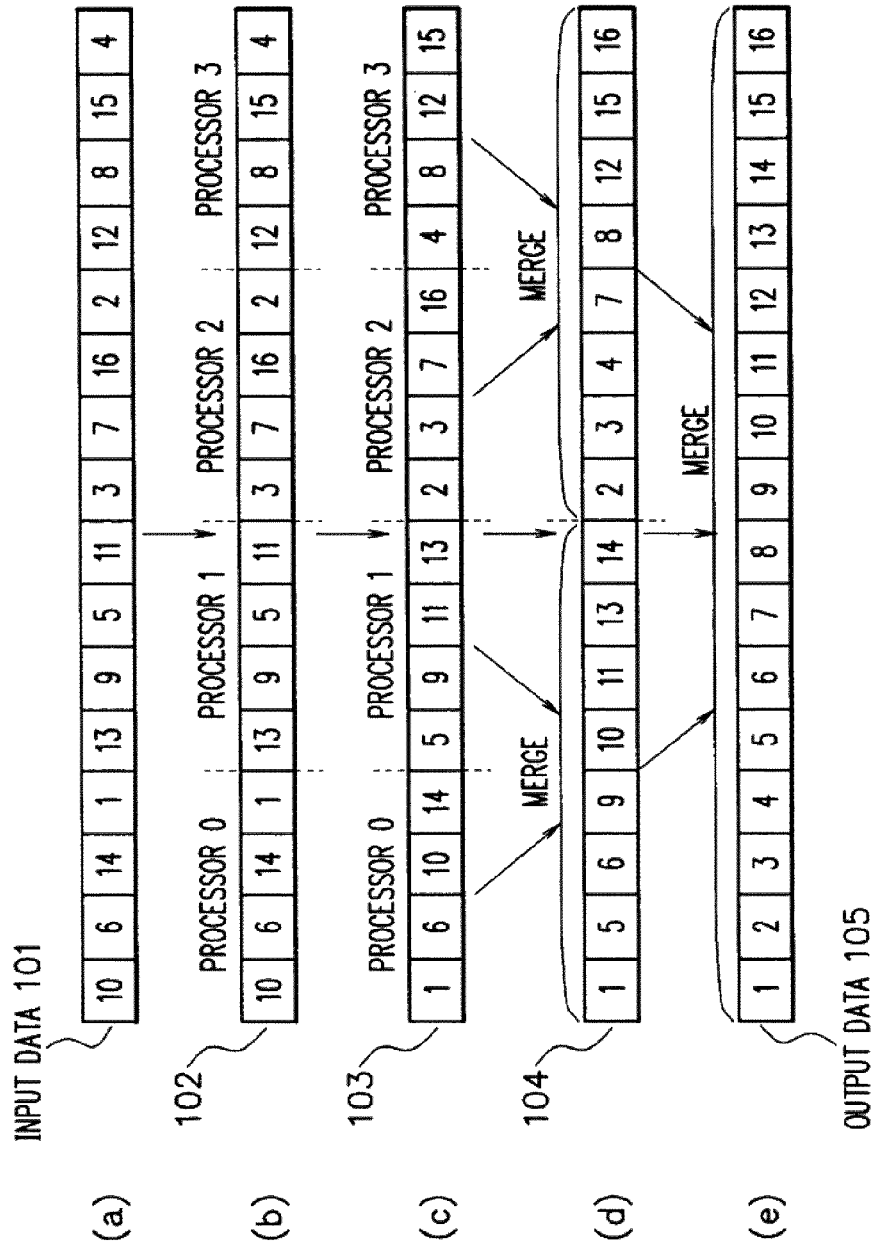
FIG. 3 is a diagram for describing a parallel sorting method disclosed in Patent Document 2.
Figure 4:
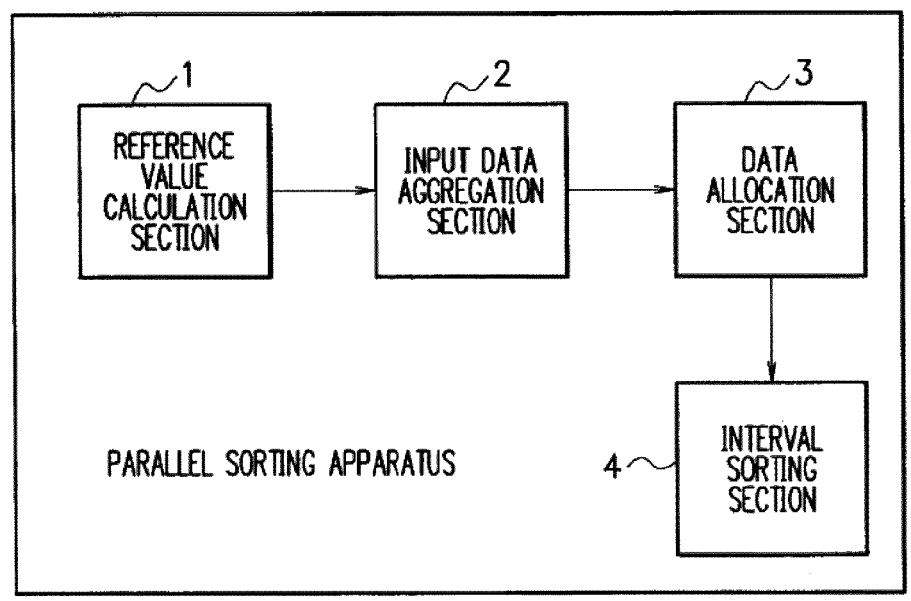
FIG. 4 is a block diagram showing a configuration of a parallel sorting apparatus according to a first exemplary embodiment.
Figure 5:
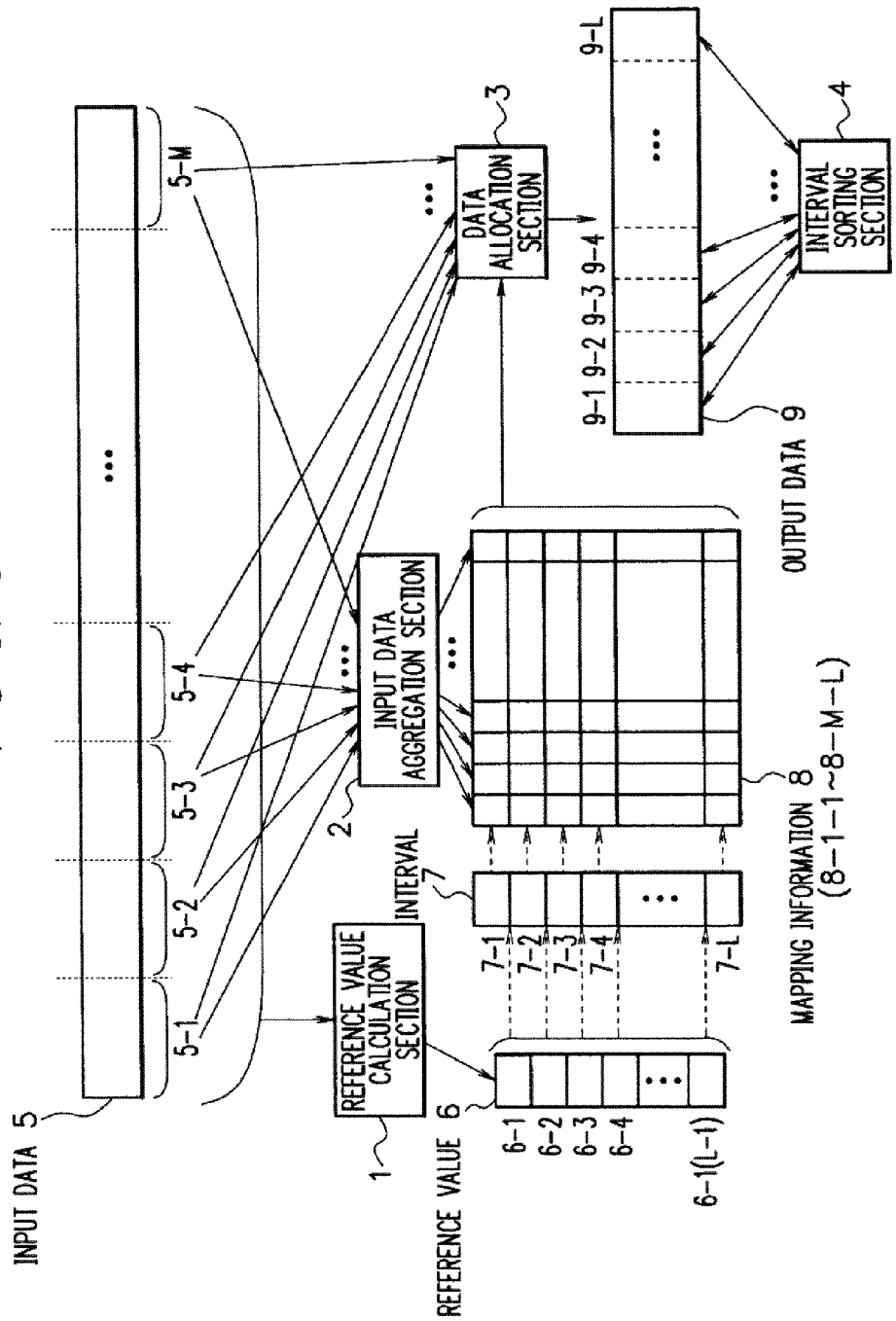
FIG. 5 is a schematic diagram for describing operation of a parallel sorting apparatus and its individual sections according to a first exemplary embodiment.
Figure 6:
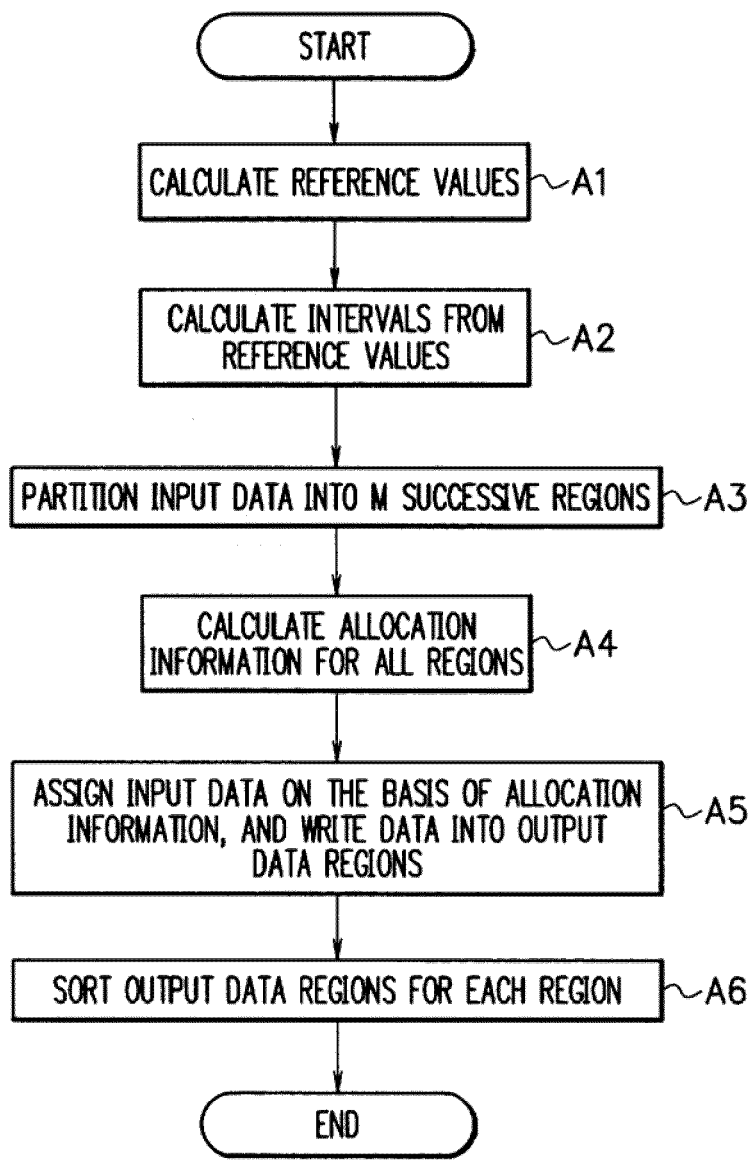
FIG. 6 is a flow chart showing operation of a parallel sorting apparatus according to a first exemplary embodiment.
Figure 7:
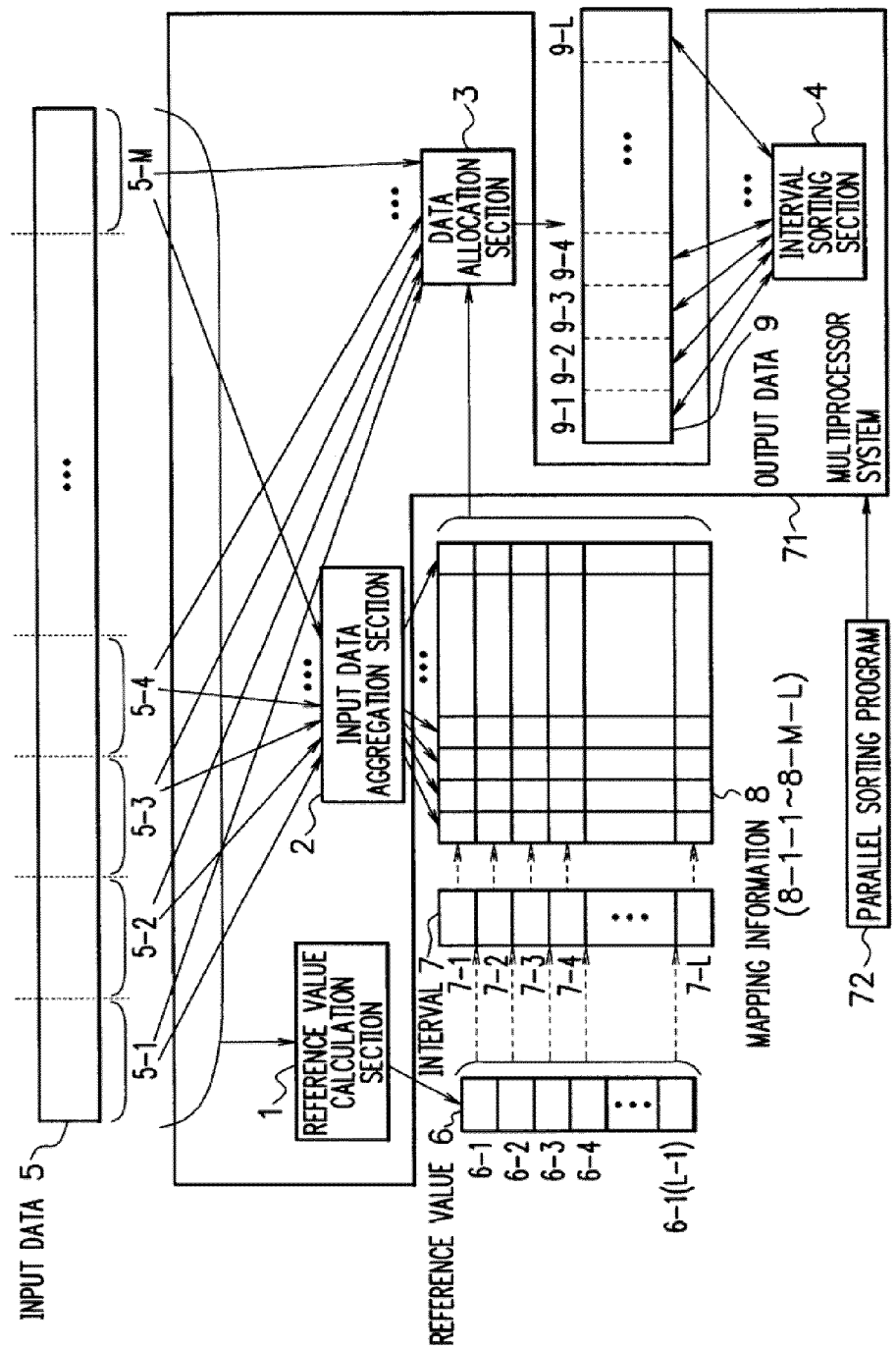
FIG. 7 is a schematic diagram for describing operation of a parallel sorting apparatus and its individual sections according to a second exemplary embodiment.
Figure 8:
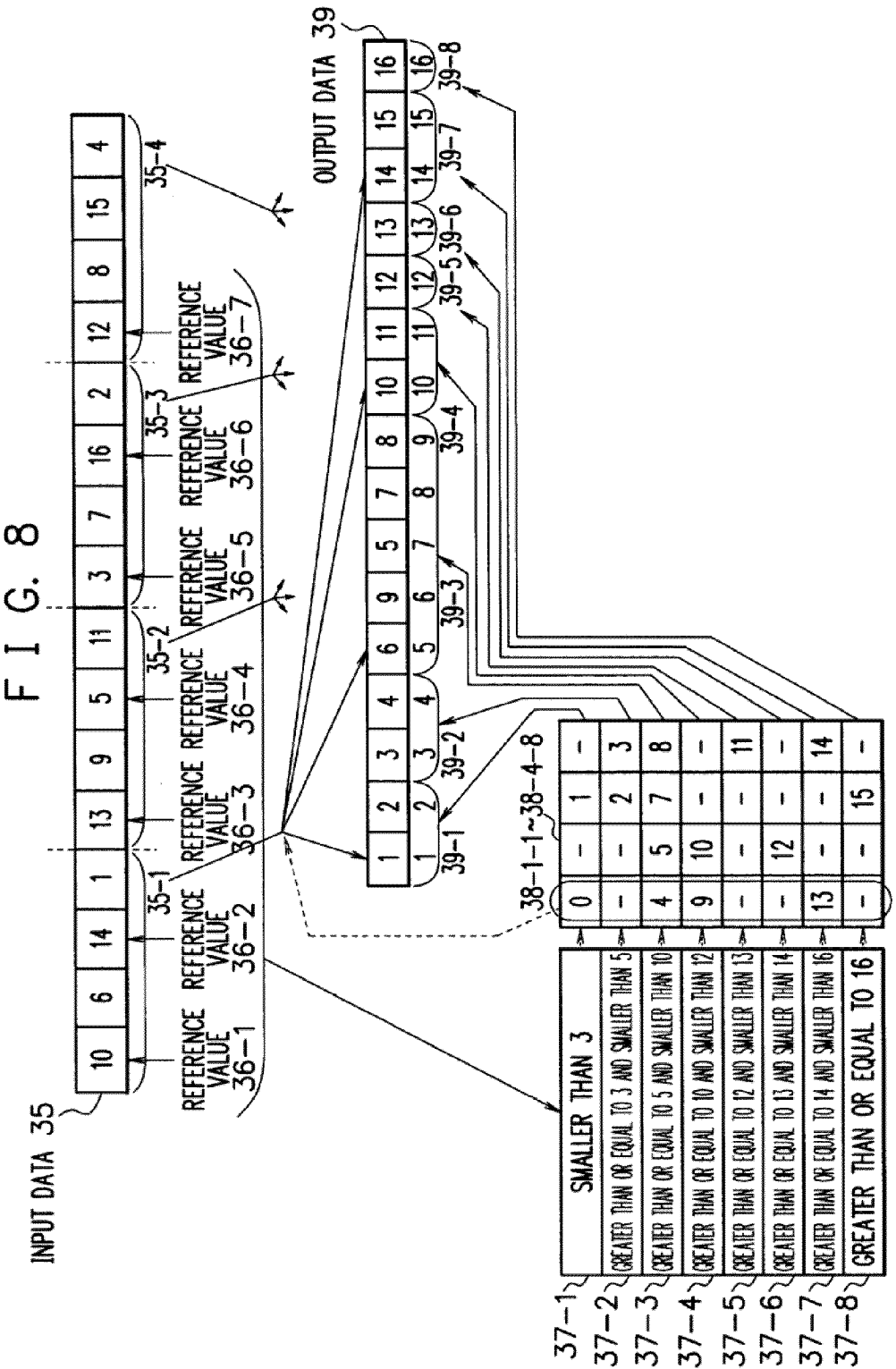
FIG. 8 is a schematic diagram for describing operation of a parallel sorting apparatus in a first example.
Figure 9:
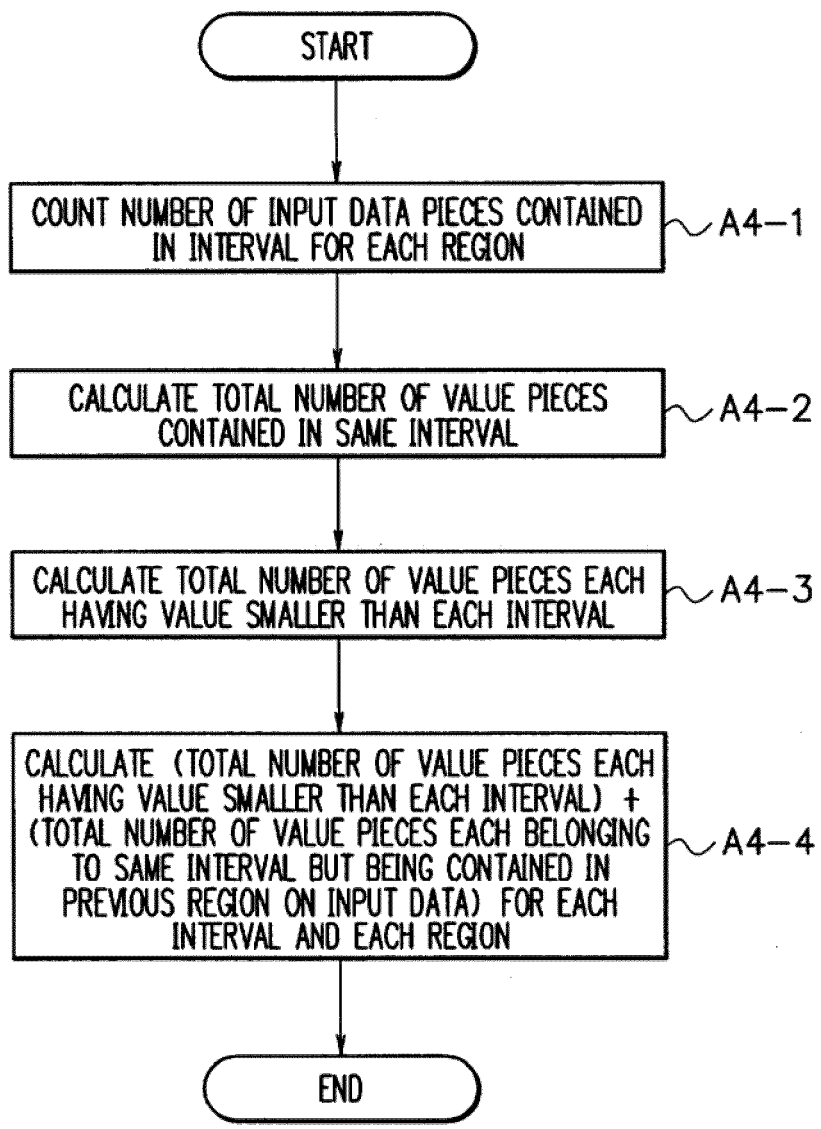
FIG. 9 is a flow chart showing detailed operation within a step A4.

1 Reference value calculation section
2 Input data aggregation section
3 Data allocation section
4 Interval sorting section
5, 35 Input data
5-1 to 5-M, 35-1 to 35-4 Input data region
6-1 to 6-L-1), 36-1 to 36-7 Reference value
7-1 to 7-L, 37-1 to 37-8 Interval
8-1-1 to 8-M-L, 38-1-1 to 38-4-8 Mapping information
9, 39 Output data
9-1 to 9-L, 39-1 to 39-8 Output data region
50-1-1 to 50-4-8 Number of data pieces
51-$j$ Total number of intervals
52-$j$ Accumulated number of pieces
71 Multiprocessor system
72 Parallel sorting program
A1 to A6, A4-1 to A4-4 Step

The invention claimed is:

1. A parallel sorting apparatus for sorting, by parallel processing, input data composed of a plurality of data pieces, comprising:
   a reference value calculation section that calculates a plurality of reference values serving as boundaries of intervals used for allocating the input data depending on a magnitude of a value thereof on the basis of the input data;
   an input data aggregation section that partitions the input data into a plurality of input data regions, and calculates, by parallel processing, mapping information used for allocating data in each of the partitioned input data regions to the plurality of intervals that have boundaries on the reference values calculated by the reference value calculation section, wherein the mapping information is information that is used, when the data contained in the plurality of input data regions are to be allocated to the plurality of intervals, for determining output data regions corresponding to the intervals where the data allocated to the plurality of intervals are to be accumulated;
   a data allocation section that allocates, by parallel processing, data in each of the input data regions to the plurality of intervals in accordance with the mapping information calculated by the input data aggregation section; and
   an interval sorting section the individually sorts, by parallel processing, data in the plurality of intervals allocated by the data allocation section,
   wherein the input data aggregation section counts the number of data pieces contained in each of the intervals for each of the input data regions, and aggregates the counted results for each input data region so as to calculate the mapping information such that each of the plurality of output data regions have a size that allows the data allocated to the intervals to be accumulated without mutual overlapping of the data.

2. The parallel sorting apparatus as claimed in claim 1, wherein the number of the input data regions is equal to the number of a plurality of processors for executing the parallel processing or to an integral multiple of the number of the processors.

3. The parallel sorting apparatus as claimed in claim 1, wherein the input data aggregation section partitions the input data into the input data regions having been equalized.

4. The parallel sorting apparatus as claimed in claim 1, wherein on the basis of the number of data pieces allocated to each of the plurality of intervals, the interval sorting section assigns the intervals to the processors such that the loads of the plurality of processors for executing the parallel processing are equalized.

5. The parallel sorting apparatus as claimed in claim 1, wherein the number of the intervals partitioned on the basis of the reference values is equal to the number of processors for executing the parallel processing or to an integral multiple of the number of the processors.

6. The parallel sorting apparatus as claimed in claim 1, wherein the reference value calculation section calculates the reference values by statistical processing onto the input data such that the numbers of data pieces to be allocated to the plurality of intervals are equalized.

7. A parallel sorting method for sorting, by parallel processing, input data composed of a plurality of data pieces, comprising:
   calculating a plurality of reference values serving as boundaries of intervals used for allocating the input data depending on a magnitude of a value thereof on the basis of the input data;
   partitioning the input data into a plurality of input data regions;
   calculating, by parallel processing, mapping information used for allocating the data in each of the partitioned input data regions to the plurality of intervals that have boundaries on the calculated reference values, wherein the mapping information is information that is used, when the data contained in the plurality of input data regions are to be allocated to the plurality of intervals, for determining output data regions corresponding to the intervals where the data allocated to the plurality of intervals are to be accumulated;
   allocating, by parallel processing, data in each of the input data regions to the plurality of intervals in accordance with the calculated mapping information; and
   individually sorting by parallel processing the allocated data in the plurality of intervals,
   wherein the number of data pieces contained in each of the intervals for each of the input data regions is counted, and the counted results for each input data region are aggregated so that the mapping information is calculated such that each of the plurality of output data regions have a size that allows the data allocated to the intervals to be accumulated without mutual overlapping of the data.

8. The parallel sorting method as claimed in claim 7, wherein the number of the input data regions is equal to the number of a plurality of processors for executing the parallel processing or to an integral multiple of the number of the processors.

9. The parallel sorting method as claimed in claim 7, wherein the input data is partitioned into the input data regions having been equalized.

10. The parallel sorting apparatus as claimed in claim 7, wherein on the basis of the number of data pieces allocated to each of the plurality of intervals, the intervals are assigned to the processors such that the loads of the plurality of processors for executing the parallel processing are equalized, and then the data in the intervals are sorted.

11. The parallel sorting method as claimed in claim 7, wherein the number of the intervals partitioned on the basis of the reference values is equal to the number of processors for executing the parallel processing or to an integral multiple of the number of the processors.

12. The parallel sorting method as claimed in claim 7, wherein the reference values are calculated by statistical processing onto the input data such that the numbers of data pieces to be allocated to the plurality of intervals are equalized.

13. A storage medium for storing a parallel sorting program for causing a computer to perform processing of sorting, by parallel processing, input data composed of a plurality of data pieces and for causing a computer to execute:
- a procedure of calculating a plurality of reference values serving as boundaries of intervals used for allocating the input data depending on a magnitude of a value thereof on the basis of the input data;
- a procedure of partitioning the input data into a plurality of input data regions;
- a procedure of calculating, by parallel processing, mapping information used for allocating the data in each of the partitioned input data regions to the plurality of intervals that have boundaries on the calculated reference values, wherein the mapping information is information that is used, when the data contained in the plurality of input data regions are to be allocated to the plurality of intervals, for determining output data regions corresponding to the intervals where the data allocated to the plurality of intervals are to be accumulated;
- a procedure of allocating, by parallel processing, data in each of the input data regions to the plurality of intervals in accordance with the calculated mapping information; and
- a procedure of individually sorting by parallel processing the allocated data in the plurality of intervals, wherein the number of data pieces contained in each of the intervals for each of the input data regions is counted, and the counted results for each input data region are aggregated so that the mapping information is calculated such that each of the plurality of output data regions have a size that allows the data allocated to the intervals to be accumulated without mutual overlapping of the data, and wherein the storage medium is a non-transitory computer-readable data storage medium on which the parallel sorting program is stored.

14. The storage medium for storing the parallel sorting program as claimed in claim 13, wherein the number of the input data regions is equal to the number of a plurality of processors for executing the parallel processing or to an integral multiple of the number of the processors.

15. The storage medium for storing the parallel sorting program as claimed in claim 13, wherein the input data is partitioned into the input data regions having been equalized.

16. The storage medium for storing the parallel sorting program as claimed in claim 13, wherein on the basis of the number of data pieces allocated to each of the plurality of intervals, the intervals are assigned to the processors such that the loads of the plurality of processors for executing the parallel processing are equalized, and then the data in the intervals are sorted.

17. The storage medium for storing the parallel sorting program as claimed in claim 13, wherein the number of the intervals partitioned on the basis of the reference values is equal to the number of processors for executing the parallel processing or to an integral multiple of the number of the processors.

18. The storage medium for storing the parallel sorting program as claimed in claim 13, wherein the reference values are calculated by statistical processing onto the input data such that the numbers of data pieces to be allocated to the plurality of intervals are equalized.

* * * * *